United States Patent [19]

Angles et al.

[11] Patent Number: 4,900,452

[45] Date of Patent: Feb. 13, 1990

[54] SEPARATION PROCESS FOR A LIQUID PHASE DISPERSED IN A CONTINUOUS LIQUID PHASE

[75] Inventors: Michel Angles, Lescar; Jean Blazejczak, Billere; Henry Roques, Garonne; Yves Aurelle, Aucamville, all of France

[73] Assignee: Societe Nationale Elf Aquitaine, Courbevoie, France

[21] Appl. No.: 237,622

[22] Filed: Aug. 24, 1988

Related U.S. Application Data

[63] Continuation of Ser. No. 912,096, Sep. 29, 1986, abandoned.

[30] Foreign Application Priority Data

Sep. 27, 1985 [FR] France .................................. 85 14969

[51] Int. Cl.$^4$ ............................................. C02F 1/24
[52] U.S. Cl. .................................... 210/706; 210/708
[58] Field of Search ................ 210/704, 706, 707, 708

[56] References Cited

U.S. PATENT DOCUMENTS

| | | | |
|---|---|---|---|
| 2,766,203 | 10/1956 | Brown et al. ....................... | 210/706 |
| 3,536,617 | 10/1970 | Collins ................................ | 210/706 |
| 3,986,954 | 10/1976 | George et al. ..................... | 210/706 |
| 4,151,075 | 4/1979 | Othmer .............................. | 210/706 |
| 4,627,922 | 12/1986 | Viator et al. .................... | 210/706 X |

Primary Examiner—Tom Wyse
Attorney, Agent, or Firm—Harold H. Dutton, Jr.

[57] ABSTRACT

A process and apparatus for separating a liquid phase dispersed in a heavier continuous liquid phase, such as a hydrocarbon dispersion in an aqueous phase, of the floatation type, wherein gas bubbles are generated in the continuous phase to assure ascending entrainment of the dispersed phase, the gas bubbles being formed from a mixture of at least one base gas which is only slightly soluble in the continuous phase, and at least one transfer gas with a higher solubility in the continuous phase, such as instance ammonia, thereby significantly improving the separation yield and efficiency.

9 Claims, 1 Drawing Sheet

SEPARATION PROCESS FOR A LIQUID PHASE DISPERSED IN A CONTINUOUS LIQUID PHASE

CROSS REFERENCE TO RELATED APPLICATION

This application is a continuation of application Ser. No. 912,096 filed Sept. 29, 1986 now abandoned.

This invention relates to a process for separating a liquid phase dispersed in a heavier, continuous phase. More particularly, the invention relates to a so-called "flotation by dispersed gas" type process comprising sending gaseous bubbles into the continuous phase in order to entrain the disperse phase and transport it upwardly. In particular the invention relates to the separation of hydrocarbons dispersed in a continuous aqueous phase, and additionally the invention relates to an improved apparatus for carrying out the process.

BACKGROUND AND OBJECTS OF THE INVENTION

Flotation processes are presently well known and accelerate the gravity separation of the lighter or less dense dispersed phase of which the droplets interact with the gas bubbles to form a complex, in which the apparent specific gravity is significantly less than that of the dispersed phase.

In practice these processes permit good yields of about 85% for a hydrocarbon dispersed in an aqueous phase. However the heretofore known flotation processes do not allow exceeding this approximate magnitude and seem to hit a ceiling less than 90%. In spite of this relatively high yield, this is a limitation which represents a substantial difficulty, since in many applications more than 10% of the disperse phase is left in the continuous phase, so that frequently a second processing stage is required which depends on different principles and which very often is quite costly. Accordingly any increase, even slight, that is achieved in the vicinity of this practical limit may prove to be economically highly significant.

DESCRIPTION OF THE INVENTION

The present invention proposes to improve this type or process of separation by flotation in order to increase the yield without thereby substantially affecting the costs.

To that end, the separation process of this invention is of the above mentioned type of flotation with dispersed gas comprising sending gas bubbles into the continuous phase, and is characterized in that these gas bubbles are formed within the continuous phase from a mixture of at least one gas, called the base gas which is only slightly soluble in the continuous phase, and of at least one other gas, called the transfer gas, having a higher solubility in the continuous phase.

The expression "at least one base gas and at least one transfer gas" denotes an effective mixture of the two gases but excludes the case of a gas that would contain the other only in a trace amount.

In practice, the gas bubbles are formed in the process of the invention from a gas mixture containing the transfer gas present in minor proportions but greater than 1% by volume, and in particular between 10 and 30%.

Moreover, a transfer gas is preferably used which has a solubility greater than 1 gram per liter of continuous phase, and a base gas is preferably used having a solubility less than 0.05 grams per liter of continuous phase.

It has been determined experimentally that the process of the invention permits achieving an increase in yield of between 3 and 10% and in some instances even reaches yields of 97 to 98% which are wholly impossible in known prior processes. This increase in yield is achieved at exceedingly low cost because it suffices to provide a gas mixture instead of the conventional bubbling gas so that neither the overall equipment design nor the processing costs are significantly affected.

This unexpected effect may be at least initially explained in the following manner. The transfer gas, which is highly soluble in the continuous phase, is present at the very interior of this continuous phase, inside the gas bubbles; it diffuses continuously through the gas/liquid interface of each bubble to then dissolve in the continuous liquid phase. As a result, it appears that the gas/liquid interface becomes more fragile, probably because of changes in the surface tension and due to the diffusion flow on the molecular scale. Under these conditions, when a gas bubble encounters a disperse phase droplet, the formation of the bubble/drop complex is facilitated due to the interaction between gas and liquid, whereby the effectiveness of each bubble/drop encounter is increased.

The gas bubbles can be formed in the continuous phase by introducing a previously prepared gas mixture and by dispersing it mechanically or hydraulically in the continuous phase, in particular using conventional turbines already used in flotation methods, or also conventional gas nozzles.

As in the known processes, the dispersion of the gas mixture in the continuous phase preferably is carried out in such a way that bubbles of an average diameter between 0.1 and 3 mm are formed, which leads to optimal results.

The gas mixture may be previously prepared by any known means, such as introducing a flow of transfer gas into the predominant flow of base gas, or evaporating a volatile liquid (of which the vapor is the transfer gas) into a flow of base gas, or also subliming a solid with a low vapor pressure (of which the vapor is the transfer gas) into a flow of base gas.

Very specifically the invention applies to separating hydrocarbons dispersed in a continuous aqueous phase. In this instance the transfer gas may be advantageously selected from the following: carbon dioxide, ammonia, methane, camphor vapor, with air being selected as the base gas.

The invention also relates to improved equipment for separating a dispersion for carrying out the above defined process. This equipment includes a flotation reactor, dispersion supply means, means for withdrawing the disperse phase at the reactor top, means for withdrawing the continuous phase at a lower level, and means for introducing and dispersing gases into the reactor; this equipment is characterized by a gas mixer being associated with the introducing and dispersing means.

DESCRIPTION OF PREFERRED EMBODIMENTS

Figure 1:
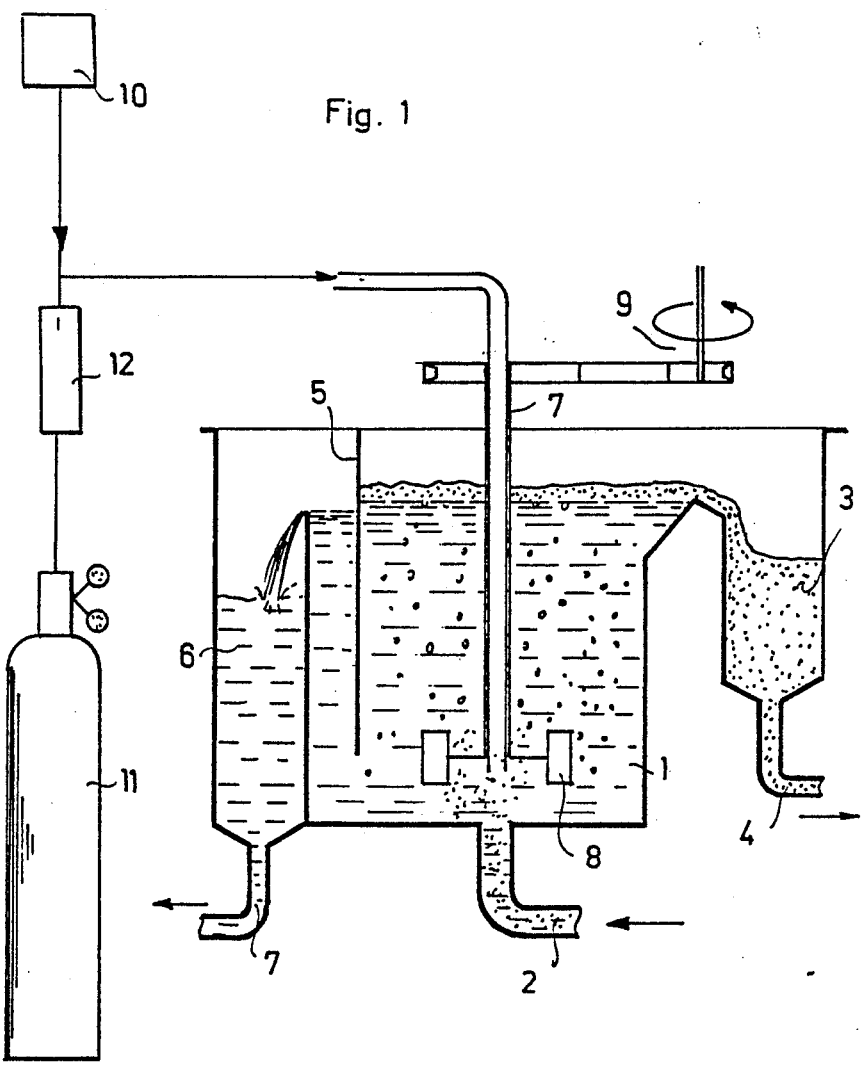

The description below is of an illustrative implementation of the process of the invention in equipment of the type schematically shown in the single Figure of the drawing.

This equipment includes a known-type flotation reactor 1 provided at its base with a dispersion supply conduit 2. This reactor is associated with a vessel 3 to withdraw the disperse phase by over-flow at the upper part of the reactor, this vessel 3 comprising at its base a withdrawal conduit 4 for the continuous phase. In this example, these means include a partition 5 dipping into the reactor and leaving a lower passage for the continuous phase, and a vessel 6 for withdrawal by overflow and provided at its lower part with a withdrawal conduit 7.

Furthermore, the reactor 1 is provided with an axial vertical conduit 7 for gas introduction and with dispersing means comprising rotary blades 8 driven by a motor 9. The conduit 7 is connected to a supply system of a gas mixture comprising air and a transfer gas. The air is fed from a compressor 10 while the transfer gas comes from a compressed gas bottle 11 passing through a dosing flowmeter 12.

In the illustrated embodiment, the dispersion comprises a kerosene emulsion in a brine with a salinity equal to 30 g/l of NaCl. This emulsion initially contains 0.5 g of kerosene per liter of water. The kerosene drops have a mean diameter of 15 to 20 microns.

The base gas comprises atmospheric air having a solubility in brine of about 0.011 g/l.

The transfer gas in the compressed gas bottle 11 is ammonia, having a solubility in brine of about 530 g/l.

The compressor 10 and the dosing flowmeter 12 are regulated in such a way that they supply a gas mixture with the following characteristics:

partial air flow: 20 l/h
partial ammonia flow: 5 l/h

The transfer gas therefor is present as 25% by volume in the mixture. The mixture bubbles dispersed by the rotary blades have a mean diameter of about 1 mm.

The flow of emulsion entering through the conduit 2 is 28 l/h.

Under these conditions, the separation yield of the kerosene phase is 92%.

The experiment was repeated under the same operating conditions with pure air at the rate of 25 l/h (identical total flow) and resulted in a separation yield of 87% for kerosene.

It must be emphasized that the increase of about 5% provided by the invention is of prime importance in industry. In this example, the process of the invention allowed reducing the concentration (500 ppm) of the initial emulsion to a residual concentration of 40 ppm, which is below the threshold of 50 ppm generally considered a limit. On the other hand, the use of pure air reduces the concentration to 65 ppm, whereby a supplementary treatment is required before disposal.

While this invention has been described as having certain preferred features and embodiments, it will be understood that it is capable of still further modification and adaptation within the spirit of the invention, and this application is intended to cover all variations, adaptations, modifications and alternatives as may fall within the spirit of the invention and the scope of the appended claims.

We claim:

1. A process for the separation of a dispersed liquid phase dispersed in a more dense continuous liquid phase by means of dispersed gas flotation, comprising introducing gas bubbles into the continuous phase for assuring an ascending entrainment of the dispersed phase, and further comprising forming said gas bubbles by introducing into and dispersing in the continuous phase a gaseous mixture containing at least one base gas slightly soluble in the continuous phase and at least one transfer gas having a higher solubility in the continuous phase, said gaseous mixture containing said transfer gas in a lesser proportion than said base gas and at a concentration greater than 1% by volume, and said transfer gas being selected from the group consisting of carbon dioxide, ammonia, methane and camphor vapor, and said base gas comprising air, whereby the transfer gas contained in each bubble is able to diffuse across the gas/liquid interface of the said bubble.

2. A separation process as in claim 1 and including forming said gas bubbles from a gas mixture containing said transfer gas in a lesser proportion than said base gas and at a concentration greater than 1% by volume.

3. A separation process as in claim 1, and wherein said gas mixture contains about 10% to 30% by volume of transfer gas.

4. A separation process as in claim 3 and including forming said gas mixture by introducing a flow of said transfer gas into a flow of said base gas.

5. A separation process as in claim 3 and including preparing said gas mixture by subliming a solid having a low vapor pressure and whose vapor constitutes the transfer gas into a flow of base gas.

6. A separation process as in claim 1 and including forming said gas bubbles in the continuous phase by introducing into said continuous phase a previously prepared gas mixture and dispersing said gas mixture into the continuous phase by mechanical or hydraulic means.

7. A separation process as in claim 6, and including carrying out said dispersing step in such a manner as to form bubbles having a mean diameter of about 0.1 to 3 millimeters.

8. A separation process as claim 6 and including forming said gas mixture by evaporating a volatile liquid whose vapor is the transfer gas into a flow of base gas.

9. A process as in claim 1, and wherein said disperse phase comprises a hydrocarbon dispersed in a continuous aqueous phase.

* * * * *